United States Patent [19]

Yada et al.

[11] Patent Number: 5,464,892
[45] Date of Patent: Nov. 7, 1995

[54] VINYL CHLORIDE RESIN COMPOSITION FOR POWDER MATERIAL

[75] Inventors: Seiko Yada, Hiratsuka; Yukihiro Ogawa, Yokohama; Takao Nomura, Toyota; Yoshiro Umemoto, Nagoya, all of Japan

[73] Assignees: Nippon Zeon Co., Ltd.; Zeon Kasei Co., Ltd.; Toyota Jidosha Kabushikaisha, all of Tokyo, Japan

[21] Appl. No.: 6,160

[22] Filed: Jan. 19, 1993

Related U.S. Application Data

[63] Continuation-in-part of Ser. No. 652,596, Jan. 28, 1991, abandoned.

[51] Int. Cl.[6] .............................. C08K 5/04; C08K 3/00; B29C 41/18
[52] U.S. Cl. .......... 524/284; 524/317; 524/322; 524/386; 524/399; 524/400; 524/401; 524/424; 524/451; 524/567; 524/513; 264/302; 264/304
[58] Field of Search .................................. 324/399, 400, 324/284, 310, 314, 317, 320, 322, 436, 513, 567; 264/219, 300, 331.13, 302, 304, 337

[56] References Cited

U.S. PATENT DOCUMENTS

| | | | |
|---|---|---|---|
| 4,380,597 | 4/1983 | Erwied et al. | 524/400 |
| 4,659,764 | 4/1987 | Isao et al. | 524/400 |
| 4,861,816 | 8/1989 | Kobayashi et al. | 524/436 |
| 5,004,776 | 4/1991 | Tadenuma et al. | 524/399 |
| 5,010,123 | 4/1991 | Worschech et al. | 524/399 |
| 5,120,783 | 6/1992 | Nosu et al. | 524/436 |
| 5,133,899 | 7/1992 | Nakazawa et al. | 524/399 |
| 5,177,135 | 1/1993 | Wehner et al. | 524/399 |

FOREIGN PATENT DOCUMENTS 3-212440  9/1991  Japan.

*Primary Examiner*—Tae H. Yoon
*Attorney, Agent, or Firm*—Nikaido, Marmelstein, Murray & Oram

[57] ABSTRACT

This invention relates to vinyl chloride resin composition suitable for automobile interior skin material of which the die pollution is low, die releasing capacity is light and amine resistance is high.

This invention provides the vinyl chloride resin composition for powder material forming characterized by the components of the mixture consisting of: 100 parts for weight of vinyl chloride resin, 0.01 to 3 parts for weight of the thermal stabilizer indicated by general formula $(RCOO)_2 M$ (in the formula, R: alkyl group having 10 to 20 carbons, M: lead, zinc, magnesium, calcium, cadmium, strontium or barium), 0.01 to 5 parts for weight of hydroxy stearic acid and/or hydroxy stearic acid dister polymer, and plasticizer.

48 Claims, No Drawings

VINYL CHLORIDE RESIN COMPOSITION FOR POWDER MATERIAL

This application is a continuation-in-part of application Ser. No. 07/652,956 filed Jan. 28, 1991 now abandoned.

[TECHNICAL FIELD]

This invention relates to vinyl chloride resin composition for powder material forming. In more details this invention relates to a vinyl chloride resin composition for powder material forming suitable for the automobile interior skin material for automobiles, etc. with high casting die releasing character and amine resistance, and with low pollution of casting dies.

[PRIOR ART]

Recently, resin skin, materials for automobile interior skin such as crush pades, console boxes, head rests, arm rests, etc. have been required to have light weight and softness, and further more, need to be high grade material having a leather pattern or a stitch pattern. For the design, a deep undercut has been required.

For manufacturing resin skin materials, soft PVC, ABS resins, paste PVC, etc. have been used. For processes of forming them, vacuum forming, sol-slash forming, sol spin forming, etc. have been adopted.

However, when vacuum forming soft PVC or ABS resins, a light weight product can be obtained. On the other hand, this process has a defect in that the product formed has a hard feeling and gives no softness. By vacuum forming, crimp or stitch pattern flows are produced without giving a high grade feeling. Also, it is difficient to form deep crimps and undercuts.

When sol-forming paste PVC, the product gives a soft feeling, however, the skin becomes thick due to a high concentration of the sol and the uniform thickness and light weight cannot be expected. Furthermore, when discharging sol from casting dies after forming or changing color, cleaning of the tank and piping requires a considerable long time, therefore, a reduction in productivity has been inevitable.

Against such a conventional skin material manufacturing process, a powder material forming process, such as the powder material slush forming process, fluidized dipping forming process, powder material spin forming proces, etc. have recently attracted attention. Especially for forming automobile interior skin materials, the powder material slush forming proces has been used.

As a powder material for such a forming process, a powder material having high fluidity and formability are necessary so that they are suitable for the characteristic forming process. For such powder materials, vinyl chloride resin compounds have been used.

These vinyl chloride resin compounds for powder material forming are manufactured normally by dry-blending PVC resins, plasticizer, stabilizer, pigment, etc. in a blender having a heating jacket in a high speed rotary mixer. Furthermore, fine grain PVC resins and inorganic filler have been added at the cooling stage after dry blending.

However, in the conventional powder material forming, the powder material is brought into directly contract with hot casting dies and melted for forming. Therefore, when a conventional vinyl chloride resin compound for powder material forming is used, the mixed material such as stabilizer added deposits gradually on the crimp surface of the casting die and pollutes die surface (die pollution problem). When the die pollution occurs, unnecessary gloss is produced on the product due to the crimp shallowness phenomenon.

To prevent occurence of this unnecessary gloss, it is necessary to stop the production line to remove pollution materials on the casting die by chemically cleaning it with alkali or acid cleaner or mechanically cleaning it by shot-blasting.

However, removal of such a pollution material causes not only a reduction in productivity but also giving chemical grinding or mechanical grinding to the casting die surface. Consequently, the crimp shallowness phenomenon is caused and the service life of casting dies is shortened.

For the powder material, the high die releasing capacity when removing the formed product from the die is important. When the die releasing capacity is unsatisfactory and a strong force is exerted at releasing, the product is elongated and the specified dimensions connot be obtained.

In improve the die releasing capacity, the metal soap stabilizer is normally used.

However, the metal soap stabilizer which is effective to improve the die releasing capacity has low comepatibility with PVC resins. Accordingly, in the conventional vinyl chloride resin compounds for powder material forming which are produced by merely mixing metal soap with PVC resins, the plateout phenomenon on the die surface occurs upon forming. This has resulted in occurrence of inevitable die pollution.

When using the skin material as an automobile interior material, in many cases, urethane is injected and foamed for packing. Therefore, powder materials used for such a skin material, must neccessarily have a high resistance the amine contained in the foaming urethane (the amine resistance).

However, since amine resistance of the conventional vinyl chloride resin composition for powder material forming is low, it has been a problem that the product is apt to discolor, deteriorate or fade under the existence of heat or light.

[SUMMARY OF THE INVENTION]

This invention is intended to settle various problems of conventional vinyl chloride resin composition for powder material forming. The objective of this invention is to provide vinyl chloride resin compositions for powder material forming suitable to make automobile interior skin material, etc. wherein die pollution does not substantially occur, die releasing is easy, and amine resistance is high, to settle such a problem. The invention provides vinyl chloride resin compositions, for powder material forming, characterized by a mixture consisting of 100 parts by weight of vinyl chloride resins having added thereto 0.01 to 3 parts by weight of a heat stabilizer indicated by the general formula $(RCOO)_2M$ (in the formula, R is an alkyl group having a carbon number of 10 to 20M and is lead, zinc, magnesium, calcium, cadmium, strontium or barium), 0.01 to 5 parts by weight of hydroxy stearic acid and/or hydroxy stearic acid diester polymer, and a plasticizer.

[DETAILED DESCRIPTION OF THE INVENTION]

As vinyl chloride resins to be used in this invention, the same vinyl chloride resins as those of conventional vinyl chloride resin compounds for powder material forming can be used. In other words, vinyl chloride homopolymers manufactured by suspension polymerization, block polymerization or emulsion polymerization; copolymers of vinyl chloride and ethylene, propylene, vinyl acetate, etc, or their mixtures can be used.

Metal carboxylate having a general formula $(RCOO)_2M$ are mixed with these vinyl chloride resins as a thermal stabilizer. However, these are unobvious types of thermal stabilizers for prevention of thermal cracking of vinyl chloride. In this invention, a specific fatty acid metal carboxylate is selected, since it has satisfactory casting die releasing capacity and has no defects of fogging and causing odor in automobiles. In this case, for the alkyl group R of the metal carboxylate, those having 10 to 20 carbons are used. Fatty acid metal carboxylate having less than ten-carbon atoms in the alkyl group, such as octanoate, heptanoate, hexanoate, etc., have high compatibility with vinyl chloride resins but, the casting die releasing and thermal stability are low, therefore, such a compound is not favorable. For the alkyl group fatty acid metal carboxylate having more than twenty carbons, the compatibility with vinyl chloride resins is low and the die releasing capacity is high. However, since their melting point is high, they do not melt when they are blended with vinyl chloride resins, or if they melt, uniform dispersion is hard to achieve. Furthermore, this compatibility with hydroxy stearic acid and/or hydroxy stearic acid diester polymers, to be added together with the metal carboxylate in this invention, is low. Therefore, this is not favorable because it causes die pollution. Metal M of the metal carboxylate is selected from lead, zinc, magnesium, cadmium, strontium and barium. Metal carboxylate containing metals other than above do not melt at forming conditions because their melting point generally exceeds the casting die temperature, depending on the number of the alkyl groups of fatty acid. Accordingly, in this invention, such a metal carboxylate is not compatible with hydroxy stearic acid and/or hydroxy stearic acid diester polymer. Therefore, die pollution is caused. Furthermore, such a metal carboxylate is not favorable from the point of safety and hygiene.

As the metal M for the metal carboxylate lead or zinc are especially suitable. Since the melting point of the metal carboxylate, consisting of lead or zinc, is lower than 100° C., easy melting and uniform dispersion can be achieved when such a metal carboxylate is dry-blended with vinyl chloride resins. Zinc is favorable, when safety and hygiene are taken into consideration. For the metal carboxylate consisting of alkyl group R and metal M as described above, mixing of one or several types of it may be acceptable.

For such a metal carboxylate, 0.01 to 3 parts by weight of it are mixed with 100 parts by weight of vinyl chloride resins. In the case of less than 0.01 part by weight, the die releasing, thermal stability and heat resistance properties are reduced. In the case of exceeding 3 parts by weight, unfavorable die pollution is caused.

For the resin composition of this invention, in addition to vinyl chloride resins and hydroxystearic acid or its ester polymers, it is effective to jointly use an inorganic thermal stabilizer such as hydrotalcite or calcium hydroxide for burning prevention and for heat stabilization as well an organic thermal stabilizer.

To the composition set forth above, hydroxy stearic acid and/or hydroxy stearic acid diester polymers are mixed. The hydroxy stearic acid or its ester polymers have previously been used as a lubricant for vinyl chloride resins. In this invention, however, the hydroxystearic acid or its ester polymers carries out its function as a detergent excess metal carboxylate is removed from the die surface by the hydroxystearic acid component to prevent deposition of the metal carboxylate on the casting die surface, thus die pollution is prevented.

Since casting dies consist mainly of metals, such as nickel, when the metal carboxylate melts at forming, the melted metal carboxylate plate outs from the vinyl chloride resin phase and selectively deposits on the metal surface by van der Waals force. When looking at the compatibility of hydroxy stearic acid or hydroxy stearic acid diester polymers with independent mixing components in the resin composition of this invention, the structure of the hydroxy stearic acid or hydroxy stearic acid diester polymers and metal carboxylate are similar to each other. Therefore, they are completely compatible with each other. Since the compatibility parameter (SP value) of hydroxy stearic acid or hydroxy stearic acid diester polymers with that of the plasticizer to be normally used for vinyl chloride resins is very close, therefore they to are compatible. For example the SP value of hydroxy steric acid or hydroxy stearic acid diester polymers is about 8.3. The SP value of phthalic acid plasticizer is about 8.9 and that of trimellitic plasticizer is about 8.6. Since the SP value of vinyl chloride resins is about 9.7, hydroxy stearic acid or hydroxy stearic acid diester polymers are also compatible with vinyl chloride resins.

From the relationship of compatibility described above, it is possible to assume a layer structural model in the die at forming [die surface-(i) thin film layer of metal carboxylate-(ii) compatible layer of metal carboxylate and hydroxy stearic acid and/or hydroxy stearic acid diester polymers and plasticizer, (iv) compatible layer of plasticizer and vinyl chloride resins].

By such a model, the die releasing which is accomplished with no exertion of shearing force at 50° to 80° C. is caused in the (ii) layer or (iii) layer, having relatively low viscosity, from among layers (i) through (iv). Due to this fact, after die releasing, the metal carboxylate remains on the die surface only as a thin layer which is close to monomolecular. The excessive metal carboxylate, which has previously been a cause of die pollution, is always removed to the product side.

By adding hydroxy stearic acid and/or hydroxy stearic acid diester polymers as described above, it is possible to effectively prevent die pollution by the metal carboxylate.

With regard to the use of hydroxy stearic acid and/or hydroxy stearic acid diester polymers, the mixing of 0.01 to 5 parts by weight per 100 parts by weight of vinyl chloride resin must be observed. Below 0.01 parts by weight, there is sufficient hydroxystearic acid component to prevent significant plateout of the metal carboxylate. Mixing in excess of five parts by weight is not favorable because plateout from the product surface continues with time at and also after forming.

For hydroxy stearic acid or hydroxy stearic acid diester polymers, either one or both of them may be mixed. However, when using resin composition of this invention as an automobile interior skin material, the use of high molecular weight diester polymers is especially favorable, from the point of view of fogging.

When making the vinyl chloride resin composition for powder material forming of this invention having especially high amine resistant, 0.1 to 10 parts by weight of perchloric acid metal compounds may be mixed additionally. It can be considered that the amine resistance of perchloric acid is improved by double relaxation mechanism relaxation of coloring by forming polyenes based on dehydrochloric acid, and relaxation of dehydrochloric in vinyl chloride resins caused by neutralization with amine-salt.

Types of perchloric acid metal compounds are not specially limited. For example, barium perchlorate, magnesium perchlorate, calcium perchlorate, perchloric acid ion type, hydrotalcite compounds, polyhydric alcohol of perchloric acid metal salts or compounds of its derivatives may be used.

As the quantity of perchloric acid metal compounds to be used, 100 parts by weight of vinyl chloride resins v.s. 0.1 to 10 parts by weight of perchloric acid metal compounds is favorable. Below 0.1 part by weight, the improvement in amine resistance is low. If the mixture contains more than 10 parts by weight, no remarkable effect can be expected and this mixing is not economical. Moreover, the strength and elongation of the formed product are liable to decrease.

For vinyl chloride resin compositions for powder material forming of this invention, in addition to the above, it is possible to appropriately mix in plasticizer, oxidation inhibitor, filler, pigment, etc.

For the plasticizer, types are not specially limited. For example, phthalic acid esters such as di-isodecyl phthalate, dialkyl phthalate of having 9 to 11 carbon atoms in the alkyl groups; trimellitic acid esters such as tri-n-octyltrimellitate, tri-2-ethylhexyl trimellitate, tri-decyltrimellitate and tri-alkyltrimellitate 7 to 11 carbon atoms in the alkyl groups; epoxy plasticizers and polyester plasticizers may be used. Several types of the above may be jointly used.

Resin compositions of this invention may be manufactured by dry-blending mixing components described above by a normal process.

By the following, resin compositions of this invention are explained in detailed.

Examples 1–6 (Comparative Examples 1–3)
<Manufacture of the Composition>

PVC having about 800 degree of polymerization (made by Nippon Zeon, Zeon 103 EP 8) was charged in a 75 Henshel mixer, then heated and stirred. When the temperature reached 80° C., various mixing components such as plasticizer, stabilizer and pigment were added as shown in Tables 1 and 2. The mixture was dried up until the temperature reached 125° C. Thereafter, heating was discontinued for cooling. When the temperature became 50° C., fine grain PVC (made by Nippon Zeon, Zeon 131C) was added: After uniform dispersion was achieved, the charged material was taken out and screened through a 40 mesh sieve. The resin composition obtained (Examples 1–6) was dry and had satisfactory fluidity.

Moreover, in the same manner as in the above examples, resin compositions for comparison (Comparative Examples 1–3) were manufactured by using mixing components shown in Table 1 and 2. <Evaluation>
(i) Die releasing Resin compositions manufactured, as shown in Examples 1 through 6 and Comparative Examples 1 through 3, were formed into sheets by the apparatus in which a 200 mm W and 750 mm L half instrument panel die is installed on an oil heating type slash former. In this case, an electrocasting die of nickel, with a crimp pattern was used. Forming conditions were; when the die reached 240° C. by oil heating, the resin compound was charged for 5 sec, the die was reversed to remove unmelted excess resin composition, then the composition was left to stand for 30 sec to accelerate melting of the resin compound. Thereafter, it was left to stand for 45 sec additionally while pouring cooling oil. When the temperature reached 75° C., cooling oil was stopped and sheets were formed. To the one end of the sheets thus manufactured, a spring balance was attached. The sheet was peeled off from the die at 200 mm/sec speed at a 60° angle. By measuring the force at the time (die releasing force) the die releasing character was evaluated.

(ii) Die pollution

The same forming as (i) above was repeated 75 times. The gloss value of the sheet obtained by the first forming and that obtained by the 75th forming were measured. By obtaining the difference in the value between these two cases, the die pollution was evalated. In other words, the greater the difference in gloss value is, the larger the degree of die pollution become.

(iii) Amine resistance

The formed sheet obtained in (i) above was packed by 10 mm thick semi-hard foaming urethane. This is suspended in a 120° C. gear over and discoloration and fading were evaluated after 200 hrs respective and 400 hrs. In this case, the evaluation standard complied with the gray scale, and discoloration and fading judgement standard. The following five stages A through E were used.

A: no change

B: slight change (not remarkable)

C: clearly observed change

D: Slightly remarkable change

E: remarkable change (iv) The powder material fluidity at forming, dimensional stability of the formed sheet before and after die releasing, ocurrence of crimp follow and mechanical strength were evaluated. Results of the above are shown in Table 3.

By this, it was confirmed that for the products of the working examples of this invention, the die releasing force was low (the die releasing capacity is satisfactory), the difference in gloss values was small, no die pollution occured, almost no discoloration and fading by heating was observed, amine resistance was high, and powder material fluidity and dimensional stability were good. Furthermore, no crimp flow occured and the mechanical strength was high. In the comparative examples, on the other hand, it was confirmed that the die releasing force was high (die releasing is difficult), the difference in gloss values was large, and die pollution progressed.

TABLE 1

| Mixing compounds | Parts for weight |
| --- | --- |
| Straight vinyl chloride resins (made by Nippon Zeon, Zeon 103 EP-8) | 100.0 |
| Fine grain vinyl chloride resins (made by Nippon Zeon, Zeon 131 C) | 10.0 |
| Plasticizer, tri-2-ethylhexyl trimellitate (made by DIC) | 65.0 |
| Hindered oxydation inhibitor | 0.2 |
| Blue pigment (made by Tokyo Ink, KV7241) | 3.0 |
| Epoxydized soybean oil (made by Adeca Argus., O-130 P) | 5.0 |

TABLE 2

| Test No. | | Stabilizer | | Metal soap | | Hydroxy stearic acid, etc. | |
|---|---|---|---|---|---|---|---|
| Example | 1 | Zeolite | | 3.0 Zinc stearate | 0.5 | Hyddroxy stearic acid diester polymer (average molocular weight: about 2,000) | 0.5 |
| | 2 | Zeolite Hydrotalcite | | 3.0 Zinc stearate 0.5 | 0.5 | Hyddroxy stearic acid diester polymer (average molocular weight: about 2,000) | 0.5 |
| | 3 | Zeolite Calcium silicate | | 2.5 Zinc stearate 1.0 | 0.5 | Hyddroxy stearic acid diester polymer (average molocular weight: about 2,000) | 0.5 |
| | 4 | Tribasic lead sulfate | | 3.0 Lead stearate | 0.5 | Hyddroxy stearic acid diester polymer (average molocular weight: about 2,000) | 0.5 |
| | 5 | Zeolite | | 3.0 Magnesium stearate | 0.5 | Hyddroxy stearic acid diester polymer (average molocular weight: about 2,000) | 0.5 |
| | 6 | Zeolite Calcium silicate | | 2.5 Magnesium stearate 1.0 | 0.5 | Hyddroxy stearic acid diester polymer (average molocular weight: about 2,000) | 0.5 |
| Comparative example | 1 | Zeolite Hydrotalicite | | 2.5 Lead stearate 0.5 | 0.5 | | |
| | 2 | Zeolite Calcium silicate | | 2.5 Magnesium stearate 1.0 | 0.5 | | |
| | 3 | Zeolite | | 2.5 Lead stearate Barium stearate | 0.5 0.5 | | |

TABLE 3

| Test No. | | Die releasing force (Kg/cm$^2$) | Die pollution difference in gloss values) | Powder material fluidity, dimensional stability, crimp flow, mechanical strength |
|---|---|---|---|---|
| Example | 1 | 0.7 | 0.2 | Satisfactory for all items |
| | 2 | 0.6 | 0.2 | Satisfactory for all items |
| | 3 | 0.7 | 0.3 | Satisfactory for all items |
| | 4 | 0.3 | 0.4 | Satisfactory for all items |
| | 5 | 0.6 | 0.3 | Satisfactory for all items |
| | 6 | 0.7 | 0.3 | Satisfactory for all items |
| Comparative example | 1 | 1.4 | 1.1 | Unsatisfactory for die releasing, die pollution |
| | 2 | 1.5 | 1.2 | Unsatisfactory for die releasing, die pollution |
| | 3 | 1.2 | 1.5 | Unsatisfactory for die releasing, die pollution |

Example 7–17 (Comparative Examples 4–11)

In the same processes as those of Examples 1 through 6 and Comparative Example 1 through 3, resin compositions were obtained by adding various mixing agents, shown in Table 4 to mixing materials, shown in Tables 5 and 6. The resin compounds thus obtained were dry powder materials having satisfactory fluidity in the same manner as those obtained in Examples 1 through 6. These resins were evaluated in the same method as that of the previous evaluation for (1) die releasing, (ii) die pollution and (iii) formability.

The result is shown in Table 7. In the same manner as Examples 1 through 6, it is clear that resin composition of Examples 7 through 17 of this invention demonstrate satisfactory results.

TABLE 4

| Mixing compounds | Parts for weight |
|---|---|
| Straight vinyl chloride resins (made by Nippon Zeon, Zeon 103 EP 8) | 100.0 |
| Fine grain vinyl chloride resins (made by Nippon Zeon, Zeon 131 C) | 10.0 |
| Plasticizer tri-2-ethylhexyl trimellifate (made by Kao Sekken, N-08) | 65.0 |
| Hydrotalcite (made by Kyowa Kagaku Kogyo, Alkamizer-1) | 0.5 |
| Calcium hydroxide | 1.0 |
| Blue pigment (made by Toyo Ink, KV7241) | 3.0 |
| Hindered phenol oxidation inhibitor | 0.2 |
| Metal soap | |
| Hydroxy stearic acid, etc. | Shown in Table 5 |
| Perchloric acid metal compound | |

TABLE 5

| | Mixing compounds (parts for weight) | | | | | |
|---|---|---|---|---|---|---|
| Example | Metal soap | | Hydroxy stearic acid, etc. | | Perchloric acid metal compound | |
| 7 | Zinc stearate | | 0.5 Hydroxy stearic acid diester polymer (average molocular weight: about 2,000) | | 0.5 Barium perchlorate | 1.0 |
| 8 | " | | 1.0 Hydroxy stearic acid diester polymer (average molocular weight: about 2,000) | | 0.5 Barium perchlorate | 1.0 |
| 9 | " | | 2.0 Hydroxy stearic acid diester polymer (average molocular weight: about 2,000) | | 0.5 Barium perchlorate | 1.0 |
| 10 | " | | 0.5 Hydroxy stearic acid diester polymer (average molocular weight: about 2,000) | | 0.5 Magnesium perchlorate | 1.0 |
| 11 | " | | 0.5 Hydroxy stearic acid diester polymer (average molocular weight: about 2,000) | | 0.5 Sodium perchlorate polyol complex solt | 1.0 |
| 12 | " | | 1.0 Hydroxy stearic acid diester polymer (average molocular weight: about 2,000) | | 0.5 Sodium perchlorate Polyol complex solt | 1.0 |
| 13 | " | | 0.5 Hydroxy stearic acid diester polymer (average molocular weight: about 2,000) | | 1.5 Barium perchlorate | 1.0 |
| 14 | " | | 0.5 Hydroxy stearic acid | | 0.5 Barium perchlorate | 1.0 |
| 15 | Stearic acid | | Hydroxy stearic acid diester polymer (average molocular weight: about 2,000) | | 0.5 Barium perchlorate | 1.0 |
| 16 | Magnesium | | 0.5 Hydroxy stearic acid diester polymer (average molocular weight: about 2,000) | | 0.5 Barium perchlorate | 1.0 |
| 17 | Zinc laurate Stearic acid | | 0.5 Hydroxy stearic acid diester polymer 0.5 (average molocular weight: about 2,000) | | 0.5 Barium perchlorate | 0.5 |

TABLE 6

| | Mixing compounds (parts for weight) | | | | | |
|---|---|---|---|---|---|---|
| Comparative Example | Metal soap | | Hydroxy stearic acid, etc | | Perchloric acid metal compound | |
| 4 | Zinc stearate | 0.5 | — | | Barium perchlorate | 1.0 |
| 5 | Zinc stearate | 1.0 | — | | Barium perchlorate | 1.0 |
| 6 | Zinc stearate Barium stearate | 0.5 0.5 | — | | Barium perchlorate | 1.0 |
| 7 | Zinc octylate | 0.5 | — | | Barium perchlorate | 1.0 |
| 8 | Zinc stearate Barium stearate | 1.0 1.0 | — | | — | |
| 9 | Zinc octylate Barium octylate | 1.0 1.0 | — | | — | |
| 10 | Zinc stearate | 5.0 | — | | — | |
| 11 | Zinc stearate | 0.5 | Hydroxy stearic acid diester polymer (average molocular weight: about 2,000) | 7.5 | | |

TABLE 7

| | | Die releasing force (Kgf/cm²) | Die pollution (difference in gloss values) | Amine resistancec, 200 h, 400 h | Powder material fluidity, dimensional stability, crimp flow, mechanical strength |
|---|---|---|---|---|---|
| Example | 7 | 0.8 | 0.1 | A–B B | Satisfactory for all items |
| | 8 | 0.6 | 0.2 | A–B B | Satisfactory for all items |
| | 9 | 0.3 | 0.3 | A–B B | Satisfactory for all items |
| | 10 | 0.8 | 0.2 | A–B B | Satisfactory for all items |
| | 11 | 0.7 | 0.2 | A B | Satisfactory for all items |
| | 12 | 0.7 | 0.2 | A–B B | Satisfactory for all items |
| | 13 | 0.6 | 0.3 | A–B B | Satisfactory for all items |
| | 14 | 0.9 | 0.2 | A–B B | Satisfactory for all items |
| | 15 | 0.6 | 0.4 | A–B B | Satisfactory for all items |
| | 16 | 1.0 | 0.2 | A–B B | Satisfactory for all items |
| | | 0.5 | 0.1 | B B | Satisfactory |
| Comparative example | 4 | 1.7 | 1.0 | A–B B | Unsatisfactory for die releasing and pollution |
| | 5 | 1.5 | 1.2 | A–B B | Unsatisfactory for die releasing and pollution |
| | 6 | 0.8 | 1.7 | A–B B | Very unsatisfactory for pollution |
| | 7 | 3.5 | 1.0 | A–B B | Unsatisfactory for die releasing and pollution |
| | 8 | 0.8 | 1.8 | C D | Unsatisfactory for pollution and heat resistance |
| | 9 | 2.7 | 1.7 | C D | Unsatisfactory for all items |
| | 10 | 0.5 | 2.5 | B C | Satisfactory for all items |
| | 11 | 0.7 | 1.5 | A–B B | Unsatisfactory for powder material fluidity, low mechanical strenght |

As explained above in detail, it is possible by this invention to obtain vinyl chloride resin compositions which are useful for powder material forming in which little die-pollution occurs die releasing is easy, and amine resistance is high. Also, it is possible to manufacture, in high productivity the light weight, soft and high grade automobile interior skin materials.

We claim:

1. A composition suitable for use in a slush molding process comprising:

100 parts by weight of a vinyl chloride resin;

0.01 to 3 parts by weight of a metal carboxylate having the formula:

(RCOO)₂M wherein R is an alkyl group containing 10 to 20 carbons atoms and M is at least one metal selected from the group consisting of lead, zinc, magnesium, calcium, cadmium, strontium and barium;

an amount, compatible with said metal carboxylate of 0.01 to 5 parts by weight, of a hydroxystearic acid diester polymer;

0.1 to 10 pats by weight of at least one perchloric acid compound selected from the group consisting of perchloric acid and a metal perchlorate; and a plasticizer.

2. A composition suitable for use in a slush molding process comprising:

100 parts by weight of a vinyl chloride resin;

0.01 to 3 parts by weight of a metal carboxylate having a formula:

(RCOO)₂M wherein R is an alkyl group containing 10 to 20 carbons atoms and M is at least one metal selected from the group consisting of lead, zinc, magnesium, calcium, cadmium, strontium and barium;

an amount, compatible with said metal carboxylate of 0.01 to 5 parts by weight, of at least one member of the group consisting of a hydroxystearic acid and a hydroxystearic acid diester polymer;

0.1 to 10 parts by weight of at least one perchloric acid compound comprising perchloric acid; and a plasticizer.

3. A composition suitable for use in a slush molding process comprising:

100 parts by weight of a vinyl chloride resin;

0.01 to 3 parts by weight of a metal carboxylate having the formula:

(RCOO)₂M wherein R is an alkyl group containing 10 to 20 carbons atoms and M is at least one metal selected from the group consisting of lead, zinc, magesium, calcium, cadmium, strontium and barium;

an amount, compatible with said metal carboxylate of 0.01 to 5 parts by weight, of at least one member of the group consisting of a hydroxystearic acid and a hydroxystearic acid diester polymer;

0.1 to 10 parts by weight of at least one perchloric acid compound comprising a polyhydric alcohol ester of perchloric acid; and a plasticizer.

4. The composition as claimed in claim 1 wherein said perchloric acid compound comprises a metal perchlorate.

5. The composition as claimed in claim 1 wherein said metal of said metal perchlorate is at least one member selected from the group consisting of barium, magnesium, and calcium.

6. A composition as claimed in claim 1 consisting essentially of said vinyl chloride resin, said metal carboxylate, said plasticizer, and said hydroxystearic acid diester polymer.

7. A composition as claimed in claim 1 additionally containing a pigment.

8. A composition as claimed in claim 6 additionally containing an inorganic thermal stabilizer.

9. A composition as claimed in claim 8 wherein said inorganic thermal stabilizer is at least one member selected from the group consisting of hydrotalcite and calcium hydroxide.

10. A composition as claimed in claim 6 wherein said metal of said carboxylate is zinc.

11. A composition as claimed in claim 1 wherein said amount of said hydroxystearic acid diester polymer is also compatible with said amount of said plasticizer.

12. A composition as claimed in claim 1 further comprising an inorganic thermal stabilizer.

13. A composition as claimed in claim 12 wherein said inorganic thermal stabilizer is at least one member selected from the group consisting of hydrotalcite and calcium hydroxide.

14. A method of forming a shaped article by slush molding which comprises:
forming a powder composition comprising:
100 parts by weight of vinyl chloride resin,
stabilizer,
0.01 to 3 parts by weight of a metal carboxylate having the formula:

$(RCOO)_2M$ wherein R is an alkyl group of 10 to 20 carbon atoms, and M is at least one metal selected from the group consisting of lead, zinc, magnesium, calcium, cadmium, strontium, and barium, and
an amount, which is compatible with said metal carboxylate, of 0.01 to 5 parts by weight, of at least one member selected from the group consisting of a hydroxystearic acid and a hydroxystearic acid diester polymer;
applying said powder composition to the inside of a mold, and
subjecting the powder composition inside said mold to molding conditions; whereby forming said shaped article inside said mold, and also forming, between said shaped article and said mold, a compatible mixture of said metal carboxylate and said hydroxystearic acid component.

15. The method of forming a shaped article by slush molding as claimed in claim 1 wherein said powder composition additionally comprises an inorganic thermal stabilizer.

16. A method as claimed in claim 14 wherein said powder composition consists essentially of: said vinyl chloride resin, said metal carboxylate, said plasticizer, said member of the group consisting essentially of hydroxy stearic acid and hydroxystearic acid diester polymer.

17. A method as claimed in claim 14 wherein said powder composition additionally contains a pigment.

18. A method as claimed in claim 14 wherein said metal of said carboxylate is zinc.

19. A method as claimed in claim 15 wherein said inorganic thermal stabilizer comprises at least one member selected from the group consisting of hydrotalcite and calcium hydroxide.

20. A method as claimed in claim 14 wherein said powder composition additionally contains 0.1 to 10 parts by weight, per 100 parts by weight of said vinyl chloride resin, of at least one perchloric acid compound.

21. A method as claimed in claim 20 wherein said perchloric acid compound comprises perchloric acid.

22. A method as claimed in claim 20 wherein said perchloric acid compound comprises a metal perchlorate.

23. A method as claimed in claim 22 wherein said metal of said metal perchlorate is at least one member selected from the group consisting of barium, magnesium and calcium.

24. A method as claimed in claim 20 wherein said perchloric acid compound comprises a polyhydric alcohol ester of perchloric acid.

25. A method as claimed in claim 14 wherein said group member consists essentially of said hydroxystearic acid diester polymer.

26. A method as claimed in claim 16 wherein said powder composition additionally contains a pigment.

27. A method as claimed in claim 16 wherein said metal of said carboxylate is zinc.

28. A method as claimed in claim 16 wherein said powder composition additionally contains an inorganic thermal stabilizer.

29. A method as claimed in claim 28 wherein said inorganic thermal stabilizer comprises at least one member selected from the group consisting of hydrotalcite and calcium hydroxide.

30. A method as claimed in claim 16 wherein said powder composition additionally contains 0.1 to 10 parts by weight, per 100 parts by weight of said vinyl chloride resin, by at least one perchloric acid compound.

31. A method as claimed in claim 30 wherein said perchloric acid compound comprises perchloric acid.

32. A method as claimed in claim 30 wherein said perchloric acid compound comprises a metal perchlorate.

33. A method as claimed in claim 32 wherein said metal in said metal perchlorate is at least one member selected from the group consisting of barium, magnesium and calcium.

34. A method as claimed in claim 30 wherein said perchloric acid compound comprises a polyhydric alcohol ester of perchloric acid.

35. A method as claimed in claim 16 wherein said group member consists essentially or said hydroxystearic acid diester polymer.

36. A method as claimed in claim 14 wherein said amount of hydroxystearic acid component is also compatible with said amount of said plasticizer.

37. In the method of forming a shaped article by molding, which method comprises:
forming a powder composition comprising:
100 parts by weight of vinyl chloride resin,
plasticizer, and
0.01 to 3 parts by weight of a metal carboxylate having the formula:

$(RCOO)_2M$ wherein R is an alkyl group of 10 to 20 carbon atoms, and M is at least one metal selected from the group consisting of lead, zinc, magnesium, calcium, strontium, and barium,
applying said powder composition to the inside of a mold;
subjecting the powder composition inside said mold to molding conditions whereby forming said shaped article inside said mold, and also forming, on an inside surface of said mold, a residual layer of said metal carboxylate at least some of which is retained on said mold inside surface after shaped article is removed from said mold; and removing said molded shaped article from said mold leaving metal carboxylate on said inside surface of said mold;

the improvement, whereby reducing the amount and the thickness of said residual layer on said inside surface of said mold, which comprises:

including in said powder composition an amount, which is compatible with said metal carboxylate, of 0.01 to 5 parts by weight of at least one hydroxystearic acid and a hydroxystearic acid diester polymer;

forming, between said shaped article and said mold, a compatible mixture of said metal carboxylate and said hydroxystearic acid component which is more adherent to said shaped article than it is to said mold; and removing at least a portion of said compatible mixture from inside said mold as a layer adherent to said shaped article.

38. An improved method as claimed in claim 37 wherein said powder composition consists essentially of: said vinyl chloride resin, said metal carboxylate, said plasticizer, and said hydroxystearic acid component.

39. An improved method as claimed in claim 37 wherein said powder composition additionally contains a pigment.

40. An improved method as claimed in claim 37 wherein said metal of said carboxylate is zinc.

41. An improved method as claimed in claim 37 wherein said powder composition additionally contains an inorganic thermal stabilizer.

42. An improved method as claimed in claim 41 wherein said inorganic thermal stabilizer comprises at least one member selected from the group consisting of hydrotalcite and calcium hydroxide.

43. An improved method as claimed in claim 37 wherein said powder composition additionally contains 0.1 to 10 parts by weight, per 100 parts by weight of said vinyl chloride resin, of at least one perchloric acid compounds.

44. An improved method as claimed in claimed 43 wherein said perchloric acid compound comprises perchloric acid.

45. An inproved method as claimed in claim 43 wherein said perchloric acid compound comprises a metal perchlorate.

46. An improved method as claimed in claim 45 wherein said metal of said metal perchlorate is at least one member selected from the group consisting of barium, magnesium and calcium.

47. An improved method as claimed in claim 43 wherein said perchloric acid compound comprises a polyhydric alcohol ester of perchloric acid.

48. An improved method as claimed in claim 37 wherein said hydroxystearic acid component consists essentially of said hydroxystearic acid diester polymer.

\* \* \* \* \*

UNITED STATES PATENT AND TRADEMARK OFFICE
CERTIFICATE OF CORRECTION

PATENT NO. : 5,464,892
DATED : November 7, 1995
INVENTOR(S) : YADA et al.

It is certified that error appears in the above-indentified patent and that said Letters Patent is hereby corrected as shown below:

Title page, Item

[73] line 3, change "Kabushikaisha" to read

-- Kabushikikaisha --.

Item

[63] line 1, change "652,596" to read

-- 652,956 --.

Signed and Sealed this

Thirteenth Day of February, 1996

Attest:

BRUCE LEHMAN

*Attesting Officer*     *Commissioner of Patents and Trademarks*